United States Patent [19]

Aulich et al.

[11] Patent Number: 4,460,556

[45] Date of Patent: Jul. 17, 1984

[54] METHOD FOR PRODUCING HIGH PURITY SI FOR SOLAR CELLS

[75] Inventors: Hubert Aulich, Munich; Karl-Heinz Eisenrith, Schliersee; Friedrich-Wilhelm Schulze, Eching; Hans-Peter Urbach, Munich, all of Fed. Rep. of Germany

[73] Assignee: Siemens Aktiengesellschaft, Berlin and Munich, Fed. Rep. of Germany

[21] Appl. No.: 486,685

[22] Filed: Apr. 20, 1983

[30] Foreign Application Priority Data

Apr. 29, 1982 [DE]  Fed. Rep. of Germany ....... 3215981

[51] Int. Cl.³ .............................................. C01B 33/02
[52] U.S. Cl. ...................................... 423/350; 423/349
[58] Field of Search ................................ 423/348–350, 423/461

[56] References Cited

U.S. PATENT DOCUMENTS 4,247,528  1/1981  Dosaj et al. ........................ 423/350
4,294,811  10/1981  Aulich et al. ...................... 423/350

FOREIGN PATENT DOCUMENTS 29157  5/1981  European Pat. Off. ............ 423/350

38-26855  12/1963  Japan .................................. 423/461

*Primary Examiner*—John Doll
*Assistant Examiner*—Steven Capella
*Attorney, Agent, or Firm*—Hill, Van Santen, Steadman & Simpson

[57] ABSTRACT

Highly purified starting materials for the production of silicon suitable for fabrication of solar cells are produced via the carbo-thermal reduction process. A carbon-containing material with impurities therein, either by itself or admixed with glass bodies, which are attained from a melt of quartz sand and glass-forming additives formed into a fiber form and pulverized, is converted into a granulate form with the aid of a bonding agent. The resultant granulates are contacted with a hot inorganic acid, such as 3N HCl at about 90° C., to extract substantially all impurities from the granulates, which can be in pellet or tablet form. The resultant purified pellets are then directly charged into an electrical arc furnace to yield solar-quality silicon. With this process, highly purified $SiO_2$ and highly purified carbon are produced in a simple and cheap manner. The impurity level for boron, phosphorus and transition metal in these starting materials is less than about 10 ppm.

14 Claims, No Drawings

METHOD FOR PRODUCING HIGH PURITY SI FOR SOLAR CELLS

BACKGROUND OF THE INVENTION

1. Field of the Invention

The invention relates to the production of Si and somewhat more particularly to a process of producing high purity starting materials for attaining Si suitable for solar cells in accordance with a carbo-thermal reduction process wherein quartz sand which has been converted into highly purified $SiO_2$ by a glass melting-/leaching process is utilized as a starting material and finely pulverized carbon is utilized as a reducing agent.

2. Prior Art

In large scale production of silicon (metallurgical grade), naturally occurring quartz is reduced with carbon (petroleum coke, coke, coal, charcoal, etc) in an electrical arc furnace. Since relatively impure starting materials ($SiO_2$-containing materials and C-containing materials) are utilized in this process, the so-produced silicon has only about a 98% degree of purity and is therefore unsuitable for fabrication into solar cells. This process can be utilized to produce solar silicon (i.e., silicon suitable for fabrication into solar cells) when the starting materials have a very high degree of purity and have the requisite degree of reactivity. Further, for a widespread economical use of solar cells, the starting materials must be attainable in a cost favorable manner and with a uniform degree of quality.

A process of the type earlier described is disclosed a published European patent application Ser. No. 0 029 157, which generally corresponds to U.S. Pat. No. 4,294,811, both of which are assigned to the instant assignee. In that process, a sodium-borosilicate glass is produced by melting impure quartz sand, boron oxide and soda and this glass melt is converted into a glass body having a large surface area (such as a fiber, tape or foil structure). During a subsequent tempering process, a phase separation occurs in the glass body whereby, in addition to a $SiO_2$-rich phase, a $Na_2O$-$B_2O_3$-rich phase is generated and in which a substantial portion of any disturbing impurities accummulate. In a following acid treatment, the $Na_2O$-$B_2O_3$-rich phase, together with the impurities, is leached from the glass body so that only highly purified $SiO_2$ remains, which can then be fed, with carbon to a reduction unit in an electrical arc. The amount of transition metal ions present in $SiO_2$ produced in this matter can be reduced in the ppm (parts per million) range and below.

A reduction of the amount of boron, which has a substantial doping effect in silicon, in $SiO_2$ can be achieved, in accordance with co-pending U.S. Ser. No. 382,668 filed May 27, 1982 now abandoned and assigned to the instant assignee, by executing the phase separation/leaching process in such a manner that no extraneous boron enters the glass melt, either before or during this process. During conversion of the raw materials into the glass phase, a mixture of aluminum oxide and carbonates and/or oxides of the elements of the alkaline metal and alkaline earth metal groups is added and a homogeneous glass melt is produced therefrom at temperatures in the range of about 1300° to 1500° C. This melt is then converted into glass fibers and subjected, without tempering, to the phase separation/leaching process. The finely pulverized $SiO_2$ attained in this manner has a degree of purity which is suitable for fabricating solar cells therefrom (typically, a boron content of less than 1 ppm and a transition metal ion content of less than 10 ppm).

In addition to highly purified $SiO_2$, highly purified carbon is also required for producing suitable Si during the carbo-thermal reduction process. At the present time, it is not possible to commercially obtain carbon having the requisite degree of purity and reactivity. The raw materials utilized for producing metallurgical-grade silicon generally have an ash content of about 0.1 to 1%, and are therefore unsuitable for use in the production of solar silicon. Graphite which has been purified by a high temperature treatment (higher than 2000° C.) with fluorinated hydrocarbons contains a considerably lower impurity level. However, such purified graphite is unsuitable for use in the $SiO_2$-reduction process because of its high cost and its low reactivity.

U.S. Pat. No. 4,247,528, which generally corresponds to German Os 30 13 319, discloses a process for producing Si suitable for solar cells by reducing $SiO_2$ with carbon, carbon black (soot), or activated carbon and converted into tablets or the like with a highly purified bonding agent, such as starch, sugar or cellulose. The silicon attained by this process, after the reduction reaction, contains less than about 7 ppm of boron and less than about 5 ppm of phosphorus. In this process, in order to further improve the degree of purity and to produce silicon of solar cell quality, the reduction process is followed by a melting process (Czochrolski crystal growth technique) in which impurities are separated zone-wise. However, this process is relatively costly, complex and fails to reliably yield high quality silicon suitable for solar cell fabrication.

SUMMARY OF THE INVENTION

The invention provides a process for producing both $SiO_2$ and carbon with a sufficient degree of purity for the $SiO_2$ carbo-thermal reduction reaction to yield silicon of solar quality and which is relatively simple and cost favorable.

In accordance with principles of the invention, a process of the type earlier described is improved by admixing a pulverized carbon-containing material having impurities therein with an acid-resistant, high temperature-tolerant bonding agent to form substantially uniform sized carbon-containing granulates or pellets, admixing purified pulverized $SiO_2$ with an acid-resistant, high temperature-tolerance bonding agent to form substantially uniform sized $SiO_2$-containing granulates, contacting at least the carbon-containing granulates with a hot inorganic acid solution so as to extract substantially all impurities therefrom, and admixing the resultant purified carbon-containing granulates with $SiO_2$-containing granulates and directly reducing the $SiO_2$ with carbon in the carbo-thermal reduction process to attain relatively pure silicon suitable for fabrication into solar cells.

In certain embodiments of the invention, the carbon-containing granulates and $SiO_2$-containing granulates are in the form of standardized pills, pellets or tablets, which preferably have an average diameter of at least about 6 mm and most preferably have an average diameter in the range of about 6 to 25 mm.

In certain embodiments of the invention, pulverized carbon-containing material is admixed with a glass body (which was formed from quartz sand and suitable glass-forming additives, and preferably was converted into a fiber form and pulverized) and with a suitable bonding agent and then formed into substantially uniformed size carbon/glass containing granulates or pellets. These carbon/$SiO_2$-containing pellets are then brought into contact with a hot inorganic acid solution, preferably 3N to 6N hydrochloric acid at a temperature of at least about 90° C., so as to extract substantially any detrimental impurities present in the carbon or the glass.

In the foregoing embodiments, the glass-forming additives can comprise an admixture of alkaline metal and alkaline earth metal oxides or carbonates, such as $Na_2O$, CaO and/or MgO, along with $Al_2O_3$.

In certain embodiments of the invention, the purified $SiO_2$-containing granulate are admixed with the purified carbon-containing granulate in such a manner that a stoichiometric mol ratio of carbon to $SiO_2$ of about 2:1 is attained. In certain forms of this embodiment, pills or pellets composed of pure $SiO_2$ and/or pure carbon can be added to the admixture of purified $SiO_2$-containing granulates and purified carbon-containing granulates to attain the necessary stoichiometric ratio of carbon to $SiO_2$.

In certain embodiments of the invention, the bonding agent utilized to form the granulates or pellets comprises a highly pure substance which will remain mechanically stable with $SiO_2$ and/or carbon at temperatures in the region of about 600° C. In certain forms of this embodiment, the bonding agent is a relatively pure substance selected from the group consisting of phenol resins, sucroses, sodium silicates and mixtures thereof.

In certain embodiments of the invention, the amount of bonding agent admixed with the pulverized carbon-containing material and/or particulate silicon dioxide-containing material is in the range of about 5 to 15% by weight, based on the respective weight of said carbon-containing material or $SiO_2$-containing material.

In certain embodiments of the invention, the pulverized carbon-containing material is composed of a material selected from the group consisting of carbon black (soot), activated carbon, ground charcoal and mixtures thereof.

DESCRIPTION OF PREFERRED EMBODIMENTS

The invention provides a process whereby both $SiO_2$ and carbon can be readily and economically produced with a sufficient degree of purity for direct use in the carbo-thermal reduction reaction to yield silicon of solar cell quality.

In accordance with the principles of the invention, pulverized carbon-containing material, which may contain detrimental impurities therein, is admixed with an acid-resistant, high temperature-tolerant bonding agent to form a plurality of carbon-containing granulates. Similarly, particulate $SiO_2$ is admixed with an acid-resistant, high temperature-tolerant bonding agent and formed into a plurality of $SiO_2$-containing granulates. The carbon-containing granulates are then brought into contact with a hot inorganic acid solution so as to extract substantially any impurity present therein and obtain substantially purified carbon-containing granulates. In instances where the $SiO_2$-containing granulates are of sufficient purity, they are simply admixed with the purified carbon-containing granulates and directly reduced in the carbo-thermal reduction reaction in an electrical arc furnace to attain relatively pure silicon. Sufficiently purified $SiO_2$ material can be obtained by admixing quartz sand or the like with suitable glass-forming additives to form a glass melt therefrom, converting such melt into large-surface area bodies and, with or without annealing, contacting such bodies with a inorganic acid solution to leach out impurities therefrom.

However, one can also proceed by admixing pulverized carbon-containing material with particulate glass bodies composed of quartz sand and glass-forming additives and co-mixing the resultant pulverized admixture with an acid-resistant, high temperature-tolerant bonding agent to form a plurality of carbon/glass-granulates. Such granulates can then be brought into contact with a hot inorganic acid solution, such as a 3N to 6N hydrochloric acid solution at a temperature of at least about 90° C., to extract substantially all impurities present in the carbon-containing material and in the glass bodies. Thereafter, the resultant purified granulates can be fed directly to an electrical arc furnace wherein the carbothermal reduction process occurs so as to attain relatively pure silicon suitable for fabrication into solar cells. The glass-forming additive comprise a mixture of alkaline metal oxides or carbonates and alkaline earth metal oxides or carbonates, such as $Na_2O$, CaO and/or MgO, and mixture thereof, along with $Al_2O_3$. Glass fibers, which for example have a diameter of about 10 to 100 $\mu$m formed from the glass melt are pulverized, mixed with a stoichiometrically required amount of finely pulverized carbon-containing material, i.e. 2 mols of carbon to 1 mol of $SiO_2$, along with a suitable acid-resistant, high temperature-tolerant bonding agent, such as highly purified phenol resin, in an amount of about 5 to 15% by weight, based on the overall weight of the dry particulate materials, and converted into pellet or tablet form. These pellets are subsequently leached in a hot inorganic acid, i.e. hydrochloric acid, whereby substantially all impurities are eliminated from the glass matrix and from the carbon. After drying, the highly purified $SiO_2$/carbon pills or pellets can be directly reduced in an electrical arc furnace to yield silicon suitable for fabrication into solar cells. If necessary, pellets or tablets composed of pure $SiO_2$ and pure carbon can be added to the reduction furnace in order to attain the necessary stoichiometric $SiO_2$/carbon ratio.

An advantage of the invention, in comparison to the process described in earlier-referenced U.S. Pat. No. 4,247,528 is that the additional step of re-melting of the silicon material (to obtain further impurity separation) is eliminated by virtue of the leaching procedure.

During this leaching/extraction process, any disturbing impurities, such as for example, calcium, aluminum and transition metals are removed so that highly purified carbon-containing granulates are obtained and which exhibit a high degree of reactivity in the reduction process. After drying, the purified granulates can immediately be used in the arc furnace. By following the principles of the invention, it is possible to obtain carbon which exhibits the following degree of purity: transition metals (Fe, Ni), Al, Mg, Ca, less than about 10 ppm with boron and phosphorus being less than about 1 ppm.

In accordance with the principles of the invention, the bonding agents utilized to form granulates of carbon-containing material and/or of $SiO_2$-containing material, or both, are highly pure substances which remain mechanically stable at temperatures in the region of about 600° C. with $SiO_2$ and/or carbon. The chemical composition of such bonding agents and their concentrations in the pellets or tables must be such that its form is not destroyed by the leaching process and adequate stability remains in the electrical arc furnace in order to prevent premature disintegration thereof but yet allows the pellets or tablets to be eliminated from the reduction furnace as dust, together with the reaction gases (CO, $CO_2$). Bonding agents having such requisite characteristics or properties are herein and in the claims designated as "acid-resistant, high temperature-tolerant" bonding agents. Preferably, such acid-resistant, high temperature-tolerant bonding agents are selected from the group consisting phenol resins, sucroses, sodium silicates and mixtures thereof.

As indicated earlier, the carbon-containing materials utilized in the practice of the invention are preferably selected from the group consisting of carbon black (soot), activated carbon, ground charcoal and mixtures thereof.

The starting materials used for preparing high-purity $SiO_2$ and high-purity carbon are inexpensive and abundantly available and may contain the following impurities in ppm W:

Quarz Sand: B,P 1-10, Na, Ca, Al $\geq$ 1000. Transition metals $\geq$ 100

Carbon: B $\leq$ 1 ppm, P1-10; Na, Ca, Al $\leq$ 10000

The purified materials contain the following impurities in ppm W:

$SiO_2$: B,P $\leq$ 1; Na, Ca, Al < 10; Transition metals < 10
C: B,P < 1; Na, Ca, Al < 10; Transition metals < 10

As is apparent from the foregoing specification, the present invention is susceptible of being embodied with various alterations and modifications which may differ particularly from those that have been described in the precedings specification and description. For this reason, it is to be fully understood that all of the foregoing is intended to be merely illustrative and is not to be construed or interpreted as being restrictive or otherwise limiting of the present invention, excepting as it is set forth and defined in the heteto-appended claims.

We claim as our invention:

1. In a process for producing highly purified silicon which is suitable for fabrication of solar cells, in accordance with a carbo-thermal reduction process wherein highly purified silicon dioxide is utilized as a starting material and finely pulverized carbon is utilized as a reduction agent, the improvement comprising:
    admixing a pulverized carbon-containing material having impurities therein with an acid-resistant, high temperature-tolerant bonding agent to form a plurality of carbon-containing granulates;
    admixing purified particulate $SiO_2$ with an acid-resistant, high temperature-tolerant bonding agent to form a plurality of purified $SiO_2$-containing granulates;
    contacting at least said carbon-containing granulates with a hot inorganic acid solution so as to extract substantially any impurities present therein and obtain substantially purified carbon-containing granulates; and
    admixing the resultant purified carbon-containing granulates with said purified $SiO_2$-containing granulates and directly reducing the $SiO_2$ with carbon via the carbo-thermal reduction process to attain relatively pure silicon suitable for fabrication into solar cells.

2. In a process as defined in claim 1 wherein said carbon-containing granulates and said $SiO_2$-containing granulates are in the form of standardized pellets or tablets.

3. In a process as defined in claim 1 wherein said pulverized carbon-containing material is admixed with pulverized glass bodies composed of quartz sand and suitable glass-forming additives, which have been converted into pulverized fiber particles so as to attain a pulverized admixture; co-mixing said pulverized admixture with an acid-resistant, high temperature-tolerant bonding agent to form a plurality of carbon/glass granulates; contacting said granulates with a hot hydrochloric acid solution to extract substantially any impurities present in said granulates and directly subjecting the purified granulates to a carbo-thermal reduction process to attain relative pure silicon suitable for fabrication into solar cells.

4. In a process as defined in claim 3 wherein said glass-forming additives comprise a mixture of alkaline metal oxides or carbonates and alkaline earth metal oxides or carbonates.

5. In a process as defined in claim 4 wherein said glass-forming additives comprise $Al_2O_3$ and a member selected from the group consisting essentially of $Na_2O$, $CaO$, $MgO$ and mixtures thereof.

6. In a process as defined in claim 1 wherein said hot inorganic acid solution comprises a 3N to 6N hydrochloric acid at a temperature of at least about 90° C.

7. In a process as defined in claim 1 wherein admixing the purified $SiO_2$-containing granulates with the purified carbon-containing granulates is such that a stoichiometric mol ratio of carbon to $SiO_2$ of about 2:1 is attained.

8. In a process as defined in claim 7 wherein pellets or tablets composed of pure $SiO_2$ and/or pure carbon are added to the admixture of purified $SiO_2$-containing granulates and purified carbon granulates to attain said stoichiometric ratio of carbon to $SiO_2$.

9. In a process as defined in claim 1 wherein said bonding agent comprises a highly pure substance which will remain mechanically stable with $SiO_2$ and/or carbon at temperature in the region of about 600° C.

10. A process as defined in claim 9 wherein said pure substances are selected from the group consisting of phenol resins, sucroses, sodium silicates and mixtures thereof.

11. A process as defined in claim 9 wherein the amount of said bonding agent admixed with said pulverized carbon-containing material and/or particulate $SiO_2$ is in the range of about 5 to 15% by weight, based on the respective weight of said carbon or $SiO_2$.

12. In a process as defined in claim 1 wherein said pulverized carbon-containing material is selected from the group consisting of carbon black, activated carbon, ground charcoal and mixtures thereof.

13. In a process as defined in claim 1 wherein said granulates are formed so as to have an average diameter greater than about 6 mm.

14. In a process as defined in claim 13 wherein said granulates have an average diameter in the range of about 6 to 25 mm.

* * * * *